US007375166B2

(12) United States Patent
Tadros et al.

(10) Patent No.: US 7,375,166 B2
(45) Date of Patent: May 20, 2008

(54) POLYMERIC BLENDS FOR OPTICAL DEVICES AND METHOD OF MANUFACTURE THEREOF

(75) Inventors: Safwat Tadros, Evansville, IN (US); Parminder Agarwal, Evansville, IN (US); Shreyas Chakravarti, Evansville, IN (US); Peter Vollenberg, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/197,110

(22) Filed: Aug. 4, 2005

(65) Prior Publication Data

US 2005/0282974 A1 Dec. 22, 2005

Related U.S. Application Data

(62) Division of application No. 10/832,850, filed on Apr. 27, 2004, now Pat. No. 7,087,682.

(51) Int. Cl.
*C08F 20/00* (2006.01)
(52) U.S. Cl. ............... 525/437; 264/176.1; 264/219; 359/109; 359/642; 428/34.1; 528/196; 528/198
(58) Field of Classification Search ............ 264/176.1, 264/219; 359/109, 642; 428/34.1; 528/196, 528/198
See application file for complete search history.

(56) References Cited

U.S. PATENT DOCUMENTS

| | | | |
|---|---|---|---|
| 2,465,319 A | 3/1949 | Whinfield et al. | |
| 2,999,835 A | 9/1961 | Goldberg et al. | |
| 3,038,365 A | 6/1962 | Peterson | |
| 3,047,539 A | 7/1962 | Pengilly | |
| 3,153,008 A | 10/1964 | Fox | |
| 3,334,154 A | 8/1967 | Kim | |
| 3,864,428 A | 2/1975 | Nakamura et al. | |
| 3,935,141 A * | 1/1976 | Potts et al. ............ | 524/322 |
| 4,001,184 A | 1/1977 | Scott | |
| 4,067,836 A * | 1/1978 | Potts et al. ............ | 204/157.15 |
| 4,123,436 A | 10/1978 | Holub et al. | |
| 4,131,575 A | 12/1978 | Adelmann et al. | |
| 4,188,314 A | 2/1980 | Fox et al. | |
| 4,264,487 A | 4/1981 | Fromuth et al. | |
| 4,544,706 A * | 10/1985 | Finch et al. ............ | 525/146 |
| 4,610,833 A | 9/1986 | Kanesaki et al. | |
| 4,786,692 A | 11/1988 | Allen et al. | |
| 4,835,245 A * | 5/1989 | Takasa et al. ............ | 528/230 |
| 4,879,355 A | 11/1989 | Light et al. | |
| 4,992,218 A | 2/1991 | Sugio et al. | |
| 5,017,659 A | 5/1991 | van der Groep | |
| 5,026,817 A | 6/1991 | Sakashita et al. | |
| 5,180,595 A | 1/1993 | Kinoshita | |
| 5,194,523 A | 3/1993 | Small, Jr. et al. | |
| 5,214,072 A | 5/1993 | Fennhoff et al. | |
| 5,230,753 A | 7/1993 | Wagner | |
| 5,399,661 A | 3/1995 | Borman | |
| 5,486,562 A | 1/1996 | Borman et al. | |
| 5,502,153 A | 3/1996 | Sakashita et al. | |
| 5,594,070 A * | 1/1997 | Jacoby et al. ............ | 525/88 |
| 5,942,585 A | 8/1999 | Scott et al. | |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 6,117,384 A | 9/2000 | Laurin et al. | |
| 6,136,441 A | 10/2000 | MacGregor et al. | |
| 6,210,872 B1 * | 4/2001 | Hosaki et al. ............ | 340/631 |
| 6,217,995 B1 | 4/2001 | Handa | |
| 6,270,698 B1 | 8/2001 | Pope | |
| 6,367,930 B1 | 4/2002 | Santelices et al. | |
| 6,458,913 B1 | 10/2002 | Honigfort et al. | |
| 6,773,649 B2 | 8/2004 | Bourne et al. | |
| 6,812,264 B2 | 11/2004 | Sunagawa et al. | |
| 2001/0044003 A1 | 11/2001 | Gallucci et al. | |

(Continued)

FOREIGN PATENT DOCUMENTS

EP 0 442 861 A2 2/1991

(Continued)

OTHER PUBLICATIONS

Japanese Abstract for JP 07-224218 A Publication date Aug. 22, 1995.

(Continued)

*Primary Examiner*—Terressa M. Boykin
(74) *Attorney, Agent, or Firm*—Cantor Colburn LLP (57) ABSTRACT

A method for manufacturing a film or sheet comprises deforming a polymeric alloy at a temperature effective to impart to the deformed alloy a birefringence retardation of greater than or equal to about 750 nanometers. A method eliminating comets and veins in an optical film or sheet comprises annealing the film or sheet to a temperature greater than the lowest glass transition temperature of the polymeric resins contained in the alloy. A composition comprises a first polymeric resin in an amount of about 1 to about 99 wt %; and a second polymeric resin in an amount of about 1 to about 99 wt %, wherein the polymeric resins are blended with a deforming force effective to produce a polymeric alloy having a birefringence retardation of greater than or equal to about 750 nanometers.

49 Claims, 3 Drawing Sheets

U.S. PATENT DOCUMENTS

| | | |
|---|---|---|
| 2002/0035207 A1 | 3/2002 | Hariharan et al. |
| 2002/0082360 A1 | 6/2002 | Conn et al. |
| 2003/0170564 A1 | 9/2003 | Kido et al. |

FOREIGN PATENT DOCUMENTS

| | | |
|---|---|---|
| EP | 0 546 748 A1 | 12/1992 |
| EP | 0 596 129 A1 | 2/1993 |
| EP | 0 737 716 A2 | 10/1996 |
| GB | 1 559 230 | 10/1977 |
| WO | WO 99/63002 | 12/1999 |
| WO | WO 01/92419 A2 | 12/2001 |

OTHER PUBLICATIONS

Raymond J. Kray et al., "Thermally Stable Polyimides with 400° F Processability" 29th Annual Technical Conference, 1974, Reinforced Plastic/Composites Institue, The Society of the Plastics Industry, Inc., pp. 1-10.

Z. Meu et al., "Modified EVA Encapsulant Formulaitons for Low Temperature Processing" Proceedings—NCPV Program Review Meeting Lakewood, Colorado, Oct. 14-17 (2001) pp. 317-318.

A. J. Hill et al. "A Free Volume Approach to the Mechanical Behaviour of Miscible Polycarbonate Blends" J. Phys.: Condens. Matter, 8, 3811-3827 (1996).

Gary M. Stack et al. "Dynamic Mechanical and Dielectric Relaxation Study of Aliphatic Polyester Based Blends" J. M. Polym. Mater. Sci. Eng. (1993), 69, 4-5, Eastman Chemical Company, Kingsport, TN 37662.

Hill et al. "A free volume approach to the mechanical behaviour [sic] of miscible polycarbonate blends", Journal of Physics: Condensed Matter, vol. 8, 1996 pp. 3811-3827.

International Search Report for PCT/US2004/013438 Internaitonal Filing Date Apr. 30, 2004.

\* cited by examiner

POLYMERIC BLENDS FOR OPTICAL DEVICES AND METHOD OF MANUFACTURE THEREOF

CROSS REFERENCE TO RELATED APPLICATIONS

This application is a division of U.S. application Ser. No. 10/832,850 filed Apr. 27, 2004, the entire contents of which are incorporated herein by reference.

BACKGROUND

This disclosure relates to polymeric blends for optical devices and method of manufacture thereof.

High optical quality devices such as films and sheets are generally sought to be utilized in many applications such as optical elements, ophthalmic lenses, and the like. These optical devices generally utilize additional functional properties such as light polarization, photo-chromism, tint, color, decor, indicia, hardness, anti-abrasion, anti fog, X-ray recording capabilities, photographic film capabilities, digital storage capabilities, light management capabilities, and the like. It is generally desirable to use polymeric alloys for these applications, where certain specific functionality can be economically and cost effectively met. Polymeric alloys however, generally suffer from drawbacks such as the presence of veins and comets, which render the film inadequate for such high quality optical applications. It is therefore generally desirable to develop polymeric alloy compositions, which can be effectively utilized in optical devices. It is additionally desirable to develop methods for processing polymeric alloys into optical films and lenses wherein such defects are reduced or eliminated.

BRIEF SUMMARY

A method for manufacturing a film or sheet comprises deforming a polymeric alloy at a temperature effective to impart to the deformed alloy a birefringence retardation of greater than or equal to about 750 nanometers.

In another embodiment, a method eliminating comets and veins in an optical film or sheet comprises annealing the film or sheet to a temperature greater than the lowest glass transition temperature of the polymeric resins contained in the alloy.

In yet another embodiment, a composition comprises a first polymeric resin in an amount of about 1 to about 99 wt %; and a second polymeric resin in an amount of about 1 to about 99 wt %, wherein the polymeric resins are treated with a deforming force or with an energy effective to produce a polymeric alloy having a birefringence retardation of greater than or equal to about 750 nanometers or with a birefringence retardation of less than or equal to about 100 nanometers.

In yet another embodiment, an optical device is manufactured by a method comprising deforming a polymeric alloy at a temperature effective to impart to the deformed alloy a birefringence retardation of greater than or equal to about 750 nanometers.

DESCRIPTION OF THE FIGURES

FIG. 2 is a photograph showing (a) voids and comets from sample # 2 (b) comet and vein free sample #4 and (c) comet and vein free sample #5;

DETAILED DESCRIPTION OF PREFERRED EMBODIMENTS

Disclosed herein are compositions comprising polymeric alloys that have a transmissivity of greater than or equal to about 86% and which are substantially free of microscopic defects such as comets and veins when examined in polarizing light in the visible spectrum of light i.e. wavelengths of about 300 nanometers (nm) to about 1000 nm. Disclosed herein is a method for producing optical films and optical lenses from polymeric alloys that have reduced numbers of defects such as comets and veins or that are substantially free of such defects. Disclosed herein too, is a method for reducing or eliminating defects such as comets and veins present in an optical device comprising an optical film or sheet manufactured from polymeric alloys. These compositions advantageously permit the use of films of thicknesses of greater than or equal to about 50 micrometers (2 mils) to less than or equal to about 1000 micrometers (40 mils). In another exemplary embodiment, these polymeric alloys may be manufactured into sheet having thickness greater than or equal to about 1001 micrometers (40.04 mils) to a thickness of less than or equal to about 10,000 micrometers (400 mils). Disclosed herein too is a polymeric alloy composition and a method for employing the polymeric alloy in the form of an optical film on a substrate, wherein the substrate has minimal thermal resistance, and wherein the film can be applied to the substrate without any substantial damage or degradation.

As defined herein, a comet is a defect generally formed around an inhomogeneity within the polymeric resin used in the film or sheet, when subjected to polarized visible light. A schematic depiction of both comets and veins may be seen in FIG. 1. As may be seen in the figure, the comet is the spherical defect generally formed around inhomogeneities such as crystallites induced by stress deformation of the polymeric resin, nucleating agents, impurities such as black specs, fillers, and the like. Comets may also form around crystallites that remain unmelted during the processing of the polymeric resin. As may be seen in the figure, veins are fibrillar type defects that generally have a branch like or tree like appearance and generally appear within the tail of the comet. Without being limited by theory, it is believed that veins are promoted by local variations in melt morphology due to factors such as phase separation, alloying inhomogeneities, and the like. These defects generally render the film or sheet unusable for high quality optical purposes.

Polymeric alloys used for such high quality optical devices, are generally blends of thermoplastics resins. Thermoplastic resins that may be used in the polymeric resins may be oligomers, polymers, ionomers, dendrimers, copolymers such as block copolymers, graft copolymers, star block copolymers, random copolymers, or the like, or combinations comprising at least one of the foregoing resins. Suitable examples of thermoplastic resins are polyolefins such as polyethylene, polypropylene; polyamides such as Nylon 4,6, Nylon 6, Nylon 6,6, Nylon 6,10, Nylon 6,12; polyesters such as polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene terephthalate) (PETG), poly(ethylene naphthalate) (PEN), poly(butylene naphthalate) (PBN); polyimides, polyacetals, polyacrylics, polycarbonates (PC), polystyrenes, polyamideimides, polyarylates, polyacrylates, polymethacrylates such as polymethylmethacrylate (PMMA), polyurethanes, polyarylsulfones, polyethersulfones, polyarylene sulfides, polyvinyl chlorides, polysulfones, polyetherimides, polytetrafluoroethylenes, polyetherketones, polyether etherketones, polyarylene ethers, liquid crystalline polymers, or the like, or combinations comprising at least one of the foregoing polymeric resins.

Blends of polyesters such as a blend comprising 100 mole percent (mole %) terephthalic acid, 65 mole % 1,4-cyclohexanedimethanol and 35 mole % ethylene glycol (entire blend denoted as PCTG), wherein the 1,4-cyclohexanedimethanol comprises a 70:30 mole ratio of trans to cis isomers, may be used in the alloy. One commercially available blend of PCTG is PCTG 5445™, which is available from the Eastman Chemical company. Polyester-carbonates (also known as copolyester-polycarbonates) (PPC) may also be used in the polymeric alloys. Amorphous polyamides such as Trogamid commercially available from Degussa Chemicals may also be used in the polymeric alloys.

Preferred polymeric alloys are PC-PCCD, PC-PETG, PC-PET, PC-PBT, PC-PCT, PC-PCTG, PC-PPC, PC-PMMA, PC-PCCD-PETG, PC-PCCD-PCT, PC-PPC-PCTG, PC-PCTG-PETG, PC-PMMA-PCT, polyphenylene ether-polyamide, polyphenylene ether polystyrene, and the like.

A preferred polymeric blend is a polycarbonate-cycloaliphatic polyester blend. As used herein, the terms "polycarbonate", "polycarbonate composition", and "composition comprising aromatic carbonate chain units" includes compositions having structural units of the formula (I):

(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

-$A^1$-$Y^1$-$A^2$- (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being bisphenol (OH-benzene-benzene-OH). The bridging radical $Y^1$ can be a hydrocarbon group or a saturated hydrocarbon group such as methylene, cyclohexylidene or isopropylidene.

Polycarbonates may be produced by the Schotten-Bauman interfacial reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

(III)

wherein $R^a$ and $R^b$ each independently represent hydrogen, a halogen atom, or a monovalent hydrocarbon group; p and q are each independently integers from 0 to 4; and $X^a$ represents one of the groups of formula (IV):

(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (III) includes the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis(hydroxyaryl)cycloalkane series such as, 1,1-bis(4-hydroxyphenyl)cyclopentane, 1,1-bis(4-hydroxyphenyl)cyclohexane, and the like; and the like, as well as combinations comprising at least one of the foregoing bisphenol compounds.

Other bisphenol compounds that may be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, and the like; bis(hydroxy diaryl)sulfides, such as 4,4'-dihydroxy diphenyl sulfide, 4,4'-dihydroxy-3,3'-dimethyl diphenyl sulfide, and the like; bis(hydroxy diaryl) sulfoxides, such as, 4,4'-dihydroxy diphenyl sulfoxides, 4,4'-dihydroxy-3,3'-dimethyl diphenyl sulfoxides, and the like; bis(hydroxy diaryl)sulfones, such as 4,4'-dihydroxy diphenyl sulfone, 4,4'-dihydroxy-3,3'-dimethyl diphenyl sulfone, and the like; and the like, as well as combinations comprising at least one of the foregoing bisphenol compounds.

Other bisphenol compounds that may be utilized in the polycondensation of polycarbonate are represented by the formula (V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like; and the like, as well as combinations comprising at least one of the foregoing bisphenol compounds.

Bisphenol compounds such as 2,2,2', 2'-tetrahydro-3,3,3', 3'-tetramethyl-1,1'-spirobi-[IH-indene]-6,6'-diol represented by the following formula (VI) may also be used.

The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates are also useful, as well as blends of linear polycarbonate and a branched polycarbonate. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 wt %, based upon the total weight of the substrate.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

Preferably, the number average molecular weight of the polycarbonate is about 500 to about 1,000,000 grams/mole (g/mole). Within this range, it is desirable to have a number average molecular weight of greater than or equal to about 1,000, preferably greater than or equal to about 5,000 g/mole, and more preferably greater than or equal to about 10,000 g/mole. Also desirable is a number average molecular weight of less than or equal to about 200,000, preferably less than or equal to about 100,000, more preferably less than or equal to about 65,000 g/mole, and most preferably less than or equal to about 35,000 g/mole.

Cycloaliphatic polyesters suitable for use in the polymeric alloys are those which are characterized by optical transparency, improved weatherability, chemical resistance, and low water absorption. It is also generally desirable that the cycloaliphatic polyesters have good melt compatibility with the polycarbonate resins. Cycloaliphatic polyesters are generally prepared by reaction of a diol with a dibasic acid or derivative. The diols useful in the preparation of the cycloaliphatic polyester resins for use as the high quality optical films are straight chain, branched, or cycloaliphatic, preferably straight chain or branched alkane diols, and may contain from 2 to 12 carbon atoms.

Suitable examples include ethylene glycol, propylene glycol, i.e., 1,2- and 1,3-propylene glycol; butane diol, i.e., 1,3- and 1,4-butane diol; diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomes in ratios of about 1:4 to about 4:1.

Within this range, it is generally desired to use a ratio of cis- to trans-isomers of about 1:3.

The diacids useful in the preparation of the cycloaliphatic polyester resins are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid of naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained in which the carboxylic acid groups are in cis- or trans-positions. The cis- and trans-isomers can be separated by crystallization with or without a solvent, for example, n-heptane, or by distillation. The cis-isomer tends to blend better, however, the trans-isomer has higher melting and crystallization temperatures and is especially preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two isomers having the carboxylic acid groups in the cis- and trans-positions are obtained. The isomers can be separated, the trans-isomer being especially preferred. Mixtures of the isomers may also be used as detailed above.

The polyester resins are typically obtained through the condensation or ester interchange polymerization of the diol or diol chemical equivalent component with the diacid or diacid chemical equivalent component and having recurring units of the formula (VII):

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof, and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexane-dimethanol-1,4-cyclohexanedicarboxylate) having recurring units of formula (VIII)

wherein in the formula (VII) $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester resins can be generally made in the presence of a suitable catalyst such as a tetra(2-ethyl hexyl)titanate, in a suitable amount, typically about 50 to 400 ppm of titanium based upon the total weight of the final product.

Poly(1,4-cyclohexanedimethanol-1,4-cyclohexanedicarboxylate) generally suitable blends with the polycarbonate. In addition, a film manufactured from poly(1,4-cyclohexanedimethanol-1,4-cyclohexanedicarboxylate) generally shows excellent adhesion to polycarbonate resin substrates, including polycarbonate blends with other thermoplastics, without using a primer.

BPA polycarbonates are preferred substrate resins for use in this invention. Films comprising blends of poly(1,4-cyclohexane-dimethanol-1,4-cyclohexanedicarboxylate) and polycarbonates also be used as the cap layers of this invention. They exhibit excellent primeless adhesion to a polycarbonate substrate when the film is bonded to the polycarbonate by lamination, hot pressing, in mold decoration, melt extrusion of the polycarbonate on to a poly(1,4-cyclohexane-dimethanol-1,4-cyclohexanedicarboxylate) film, coextrusion of both resins, or any similar bonding or joining technique known to those in the art.

It is generally desirable for a polycarbonate-poly(1,4-cyclohexane-dimethanol-1,4-cyclohexanedicarboxylate) alloy to have a melt volume rate of greater than or equal to about 5 cubic centimeters/10 minutes (cc/10 min or ml/10 min) to less than or equal to about 150 cubic centimeters/10 minutes when measured at 265° C., at a load of 2.16 kilograms and a four minute dwell time. Within this range it is generally desirable to have a melt volume rate of greater than or equal to about 7, preferably greater than or equal to about 9, and more preferably greater than or equal to about 10 cc/10 min when measured at 265° C., at a load of 2.16 kilograms and a four minute dwell time. Also desirable within this range is a melt volume rate of less than or equal to about 125, preferably less than or equal to about 110, and more preferably less than or equal to about 100 cc/10 minutes.

In general, it is desirable for the polycarbonate-poly(1,4-cyclohexane-dimethanol-1,4-cyclohexanedicarboxylate) alloy to have a glass transition temperature of less than or equal to about 205° C., preferably less than or equal to about 175° C., and more preferably less than or equal to about 150° C., and most preferably less than or equal to about 125° C.

The thermoplastic polymeric resins may be blended in any desired suitable ratios to form the polymeric alloy. Binary blends, ternary blends and blends having more than three resins may also be used in the polymeric alloys. When a binary blend or ternary blend is used in the polymeric alloy, one of the polymeric resins in the alloy may comprise about 1 to about 99 weight percent (wt %) based on the total weight of the composition. Within this range, it is generally desirable to have the one of the polymeric resins in an amount greater than or equal to about 20, preferably greater than or equal to about 30 and more preferably greater than or equal to about 40 wt %, based on the total weight of the composition. Also desirable within this range, is an amount of less than or equal to about 90, preferably less than or equal to about 80 and more preferably less than or equal to about 60 wt % based on the total weight of the composition. When ternary blends of blends having more than three polymeric resins are used, the various polymeric resins may be present in any desirable weight ratio.

In order to make a polymeric alloy without any defects such as comets and veins, it is generally desirable to deform the alloy into a film at lower temperatures and at lower speeds than is normally undertaken in the processing of such films. In general with regard to the lower temperatures at which such deformational forces are applied, it is generally desirable to deform the alloy at temperatures below the glass transition temperature of the alloy. Thus while the temperature of the alloy is not always necessarily below the glass transition temperature ($T_g$) of the alloy, the device through which the deformational force is applied, is held at a temperature that is lower than the glass transition temperature of the alloy.

In an exemplary embodiment, the deforming forces are shear, compressive or elongational forces or a combination of any two of the aforementioned forces or a combination of all three forces if desired. These deformational forces may be applied either simultaneously or sequentially if desired. It is generally desired to maintain the temperature of the machine part contacting the alloy and applying these deformational forces at temperatures below the $T_g$ of the alloy. In another exemplary embodiment, it is desirable to maintain the temperature of the machine part contacting the alloy and applying the deformational forces at 5° C., preferably 10° C., more preferably 15° C. and most preferably 20° C. below the $T_g$ of the alloy.

In order to produce a film or sheet having a reduced number of comets or veins, it is generally desirable to deform the alloy in an amount effective to impart to the deformed alloy a birefringence retardation of greater than or equal to about 750 nanometers. It is generally preferred to have a birefringence retardation greater than or equal to about 800, preferably greater than or equal to about 850, and more preferably greater than or equal to about 1000 nm.

The film or sheet obtained as a result of the aforementioned deforming forces generally has a number of less than or equal 0.25 comets/square centimeter, preferably less than or equal to about 0.2 comets/square centimeter, and more preferably less than or equal to about 0.1 comets/square centimeter. It is most preferable to have the film or sheet substantially free from comets.

In another embodiment, a polymeric alloy film or sheet having defects such as comets and veins can be rendered substantially comet-free and vein-free by annealing the film at a temperature that is greater than the glass transition temperature of the polymeric resin in the alloy having the highest glass transition temperature. For example, if $T_{gA}$ is the glass transition temperature of polymeric resin A and $T_{gB}$ is the glass transition temperature of polymeric resin B both of which are contained in a polymeric alloy having an alloy glass transition temperature of $T_{g(A+B)}$, such that $T_{gB} > T_{g(A+B)} > T_{gA}$, then annealing the alloy at a temperature greater than or equal to $T_{gB}$ will render the alloy comet-free or defect free. While annealing at a temperature greater than or equal to about the glass transition temperature of the polymeric resin having the highest $T_g$ in the alloy will generally reduce or minimize the number of comets and/or veins in the alloy, it is not always necessary to do so. For example, if it is known that the comets and/or veins are formed only in the polymeric resin A, having the lower glass transition temperature $T_{gA}$, or in the interface between resin A and B, then it may be desirable to heat to a temperature greater than or equal to about $T_{gA}$ and less than or equal to about $T_{g(A+B)}$ or alternatively it may also be desirable to heat the polymeric alloy to a temperature of about $T_{g(A+B)}$ to about $T_{gB}$ to eliminate the comets and/or veins.

It is generally desirable to anneal the polymeric alloy films or sheets for a time period of up to about 30 minutes. Within this range it is generally desirable to anneal the film for a time period greater than or equal to about 10 seconds, preferably greater than or equal to about 60 seconds, preferably greater than or equal to about 1 minute, and most preferably greater than or equal to about 2 minutes. Also desirable within this range, is an annealing time of less than or equal to about 25 minutes, preferably less than or equal to about 20 minutes, and more preferably less than or equal to about 15 minutes. The film or sheet may be annealed either using conduction, convection, radiation or combinations comprising at least one of the foregoing methods of heating.

In yet another exemplary embodiment, a film prepared from a polymeric alloy having a melt volume rate greater than or equal to about 10 cubic centimeter/10 minutes (cc/10 min) in the above described manner may be molded over a temperature sensitive substrate at a temperature low enough so as not to destroy or disturb the substrate. The high melt volume rate of the alloy permits the alloy to be molded at temperatures less than or equal to about 400° F. Despite the ability of the alloy to be molded at low temperatures of less than or equal to about 400° F., they preserve their inherent superior mechanical properties thus provide adequate protection to the substrate. The properties of the alloy may be further improved by the addition of impact modifiers to the alloy. A suitable example of a low temperature substrate over which these alloys may be molded at temperatures of less than or equal to about 400° F., is a polarizer in an application for polarizing sunglasses.

In general when a film or sheet having comets is annealed to render it substantially free from comets, the film will preferably have a birefringence retardation of less than or equal to about 100 nm, preferably less than or equal to about 75 nm, preferably less than or equal to about 50 nm, and more preferably less than or equal to about 25 nm.

In one embodiment, in one method of manufacturing the polymeric alloy, a blend comprising polycarbonate and poly(1,4-cyclohexanedimethanol-1,4-cyclohexanedicarboxylate) are first extruded in a twin screw extruder. The extrudate is pelletized and dried. The pellets are then extruded in a single screw extruder and the extrudate from the single screw extruder is fed to a calendaring two roll mill having both rolls polished. Such a roll mill is often referred to as a polish/polish calendaring roll mill. The surfaces of the roll mill are held at a temperature less than or equal to about the $T_g$ of the alloy and the calendaring is conducted at a speed effective to produce a birefringence retardation of greater than or equal to about 750 nm.

The films obtained from the above detailed method are optically clear, and can be manufactured in compositions having a high melt rate so as to permit them to be molded upon substrates that can withstand temperatures of less than or equal to about 400° F. Polymeric alloys manufactured in such a manner advantageously do not possess any defects such as comets and veins and therefore can be utilized in optical applications such as optical elements, ophthalmic sheets, microscopes and the like. In addition additives which facilitate the incorporation of functional properties such as light polarization, photo-chromism, tint, color, decor, indicia, hardness, anti-abrasion, anti fog, X-ray recording capabilities, photographic film capabilities, digital storage capabilities, light management capabilities, and the like may be added to the polymeric alloy.

The following examples, which are meant to be exemplary, not limiting, illustrate compositions and methods of manufacturing some of the various embodiments of the environmentally resistant coatings using various materials and apparatus.

EXAMPLES

Example 1

This example was conducted to demonstrate that a film of a polymeric alloy comprising polycarbonate and poly(1,4-cyclohexanedimethanol-1,4-cyclohexanedicarboxylate) could be manufactured without any comets and veins when examined under polarized light. Additionally this experiment was conducted to demonstrate that a film of a polymeric alloy can be annealed to remove any existing comets and/or veins. The film was made by extruding an alloy of polycarbonate and poly(1,4-cyclohexanedimethanol-1,4-cyclohexanedicarboxylate) in a weight ratio of 1:1 in a 70 millimeter (mm) Werner and Pfleiderer (mega-compounder) twin screw extruder. A quencher comprising phosphoric acid was used to minimize any reaction between the polycarbonate and the poly(1,4-cyclohexanedimethanol-1,4-cyclohexanedicarboxylate). No UV inhibitors were used in these examples. The alloy was first pelletized and dried at a temperature of about 180° F. for 6 hours. The dried pellets were then extruded in a single screw extruder having a 4.5 inch (11.43 centimeters) screw diameter. The single screw extruder was a single stage, barrier type extruder with an L/D of 32:1 and with a flex lip die. The extrusion conditions are shown in Table 1.

TABLE 1

| Parameter | Value |
| --- | --- |
| Extruder diameter (inches) | 4.5 |
| Drying temperature (° F.) | 180 |
| Drying Time (hours) | 6 |
| Extruder Temperatures (° F.) | Pre-set |
| Zone 1 (° F.) | 380 |
| Zone 2 (° F.) | 400 |
| Zone 3 (° F.) | 410 |
| Zone 4 (° F.) | 420 |
| Zone 5 (° F.) | 440 |
| Zone 6 (° F.) | 460 |
| Adapter Temperature (F) | 460 |
| Die Lips Temperature (° F.) | 488 |
| Screw RPM | 21.4 |
| Extruder Amps | 212 |
| Screen mesh | 105 |
| Roll Stack Temperature (° F.) | 175/165 |
| Nip force PLI lbf/inch | 161 |
| Production speed (feet/min) | 14.2 |

The extrudate from the single screw extruder was fed into a highly polished oil cooled roll stack. The film emerging from the roll stack is a polish/polish film having a thickness of 20 mils. The film obtained in this manner was free from comets and/or veins.

Example 2

The films in this example were similar in composition to those of Example 1 above and were processed in a similar manner except for the production speed of the calendaring rolls and the temperature of the rolls. Data for all the samples is shown in the table below. At least five measurements were made on each sample. Samples 1, 2 and 3 are comparative examples, while sample 4 is the sample obtained from Example 1 above. Sample 5 is a sample, which was annealed at 150° C. for 3 minutes.

TABLE 2

|  | Comparative Example (Sample #1) | Comparative Example (Sample #2) | Comparative Example (Sample #3) | Invention Example (Sample #4) | Invention Example (Sample #5) |
| --- | --- | --- | --- | --- | --- |
| Defects comets/veins | no | yes | yes | no | no |
| Birefringence Retardation (nm) | 500 | 450 | 650 | 950 | 8 |
| Production speed (ft/min) | 20 | 20.8 | 14.94 | 14.4 | 20.8 |
| Roll 2 Temperature (° F.) | 250 | 165 | 180 | 165 | 165 |
| Nip force (lbf) | 3710 | 2590 | 2750 | 3380 | 2590 |
| Annealing at for 15 minutes at 150° C. | not annealed | not annealed | not annealed | not annealed | yes |
| Resin | PC | PC/PCCD | PC/PCCD | PC/PCCD | PC/PCCD |

As may be seen from Table 2, as the production speed and the temperature of the rolls is reduced, the veins and comets disappear. This is clearly demonstrated in sample 4 where a production speed of 14.4 feet/minute and a roll temperature of 165° C. produces a film having no comets or veins. Similarly, for sample 5, the annealing at 150° C. removes all comets and veins.

Figure 1:
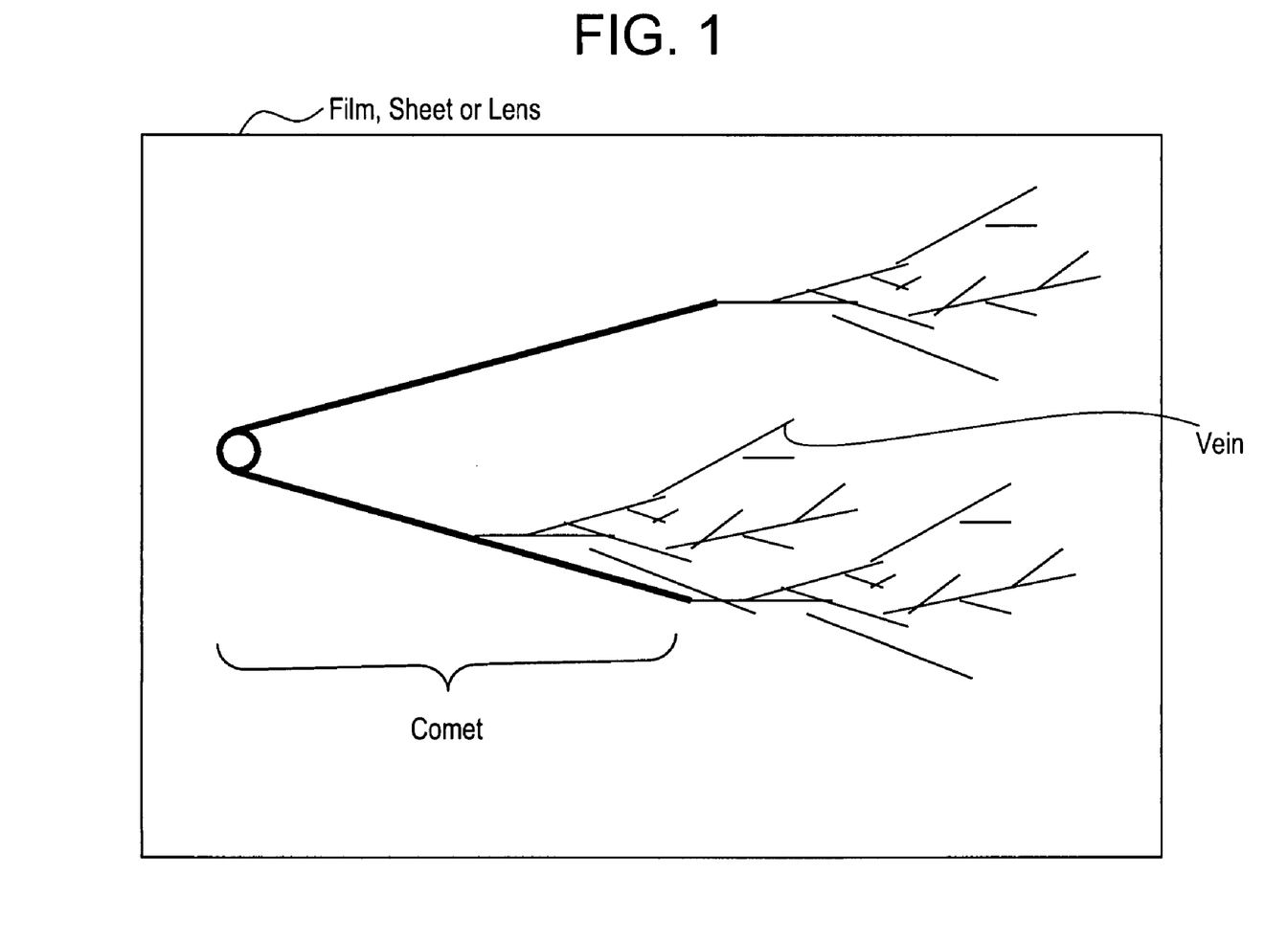
FIG. 1 is a schematic representation of a polymeric film or sheet having comets and voids.
Figure 2A:
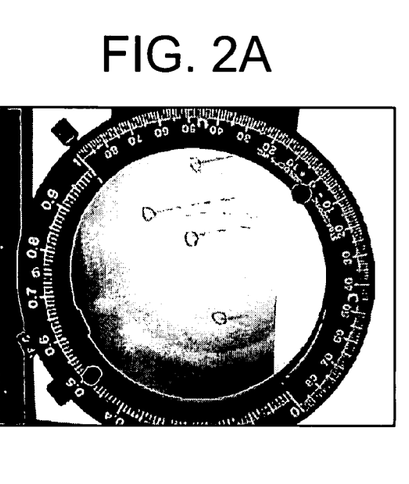
Figure 2B:
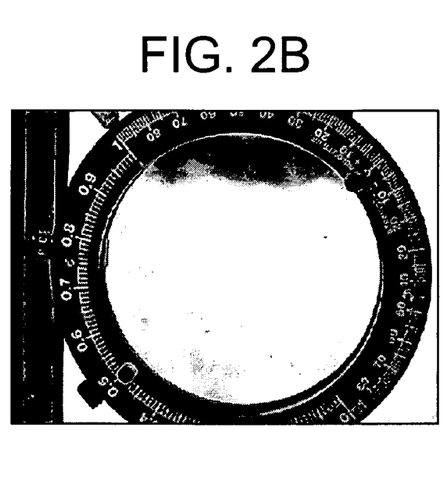
Figure 2C:
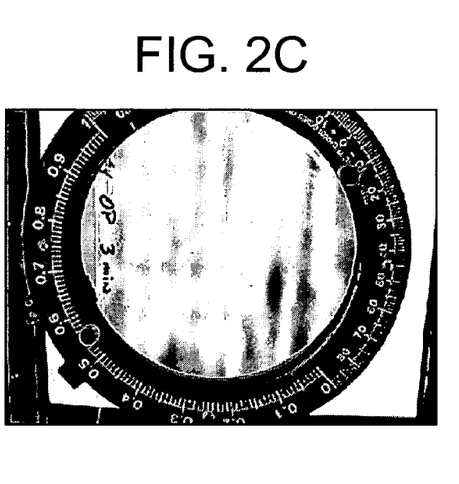

The comets and veins seen in the comparative examples of Table 2 may be seen in the FIG. 2 below when the corresponding films are examined under polarized light. Similarly the sample #4 and sample #5 shown in the FIG. 1 show no comets and veins when examined under polarizing light. The films in samples #4 and #5 are high quality optical films and show a birefringence retardation of about 750 to about 925 nm.

Example 3

These examples were undertaken in order demonstrate that it is possible to obtain polycarbonate-polyester blends having very high melt volume rates (low melt viscosity) and are therefore excellent for low temperature processability. Films made from such blends can be molded over substrates having a low thermal resistance, i.e., the substrates degrade upon being subjected to high temperatures. The blend contains high flow polycarbonate, poly(1,4-cyclohexanedimethanol-1,4-cyclohexanedicarboxylate), oligomeric polycarbonate (R2 oligomer), pentaerythritol tetrastearate, and phosphoric acid pre-diluted to 10%. Despite the low melt viscosity, these blends still have extremely good mechanical and physical properties, as evidenced from Table 3, and 4. These results are generally unexpected, since a low melt viscosity generally translates to poor mechanical and physical properties. When the blends have low impact properties, the properties may be increased by the inclusion of impact modifiers such as Blendex 415 as shown in Table 5. Table 6 compares the processing properties of PMMA and polycarbonate where it may be seen that polymeric resins having a high melt volume rate generally demonstrate a loss in mechanical properties. Table 7 highlights the ease of low temperature processing of the blends.

TABLE 3

| Composition | Sample #6 | Sample #7 | Sample #8 | Sample #9 | Sample #10 | Sample #11 |
|---|---|---|---|---|---|---|
| PC high flow | 14.470 | 44.470 | 39.470 | 26.970 | 29.470 | 49.470 |
| PCCD, 2k poise | 50.000 | 20.000 | 50.000 | 50.000 | 35.000 | 30.000 |
| R2 oligomer | 35.000 | 35.000 | 10.000 | 22.500 | 35.000 | 20.000 |
| Pentaerythritol tetrastearate | 0.300 | 0.300 | 0.300 | 0.300 | 0.300 | 0.300 |
| Phosphoric Acid pre-diluted to 10% | 0.075 | 0.075 | 0.075 | 0.075 | 0.075 | 0.075 |
| PEP-Q | 0.150 | 0.150 | 0.150 | 0.150 | 0.150 | 0.150 |
| Total | 100.00 | 100.00 | 100.00 | 100.00 | 100.00 | 100.00 |
| Physical Properties | | | | | | |
| Flexural Mod. (PSI) | 285000 | 350000 | 274000 | 276000 | 315000 | 325000 |
| Secant Mod. @2% Strain (PSI) | 281000 | 344000 | 271000 | 270000 | 311000 | 320000 |
| Flexural Str. (PSI) | 11800 | 13100 | 11700 | 11600 | 13200 | 13800 |
| HDT (° C.) | 71.3 | 93.3 | 77.5 | 73.8 | 81.3 | 89.2 |
| HDT (Parts, in ° C.) | 81.2 | 105.5 | 88.2 | 84.4 | 93.1 | 102.0 |
| Izod: Ductility (%) | 0 | 0 | 0 | 0 | 0 | 0 |
| Impact Strength (lbf/in) | 0.229 | 0.208 | 4.744 | 0.523 | 0.201 | 1.108 |
| MAIMPACT-Ductility (%) | 0 | 0 | 100 | 80 | 0 | 80 |
| Energy to Max Load (ft-lbf) | 7.2 | 5.1 | 42.8 | 29.5 | 15.5 | 24.7 |
| Total Energy (ft-lbf) | 7.9 | 5.5 | 54.6 | 35.4 | 16.9 | 27.5 |
| MVR (cm³/10 min)* | 90.90 | 76.40 | 36.60 | 57.70 | 80.40 | 48.90 |
| Tensile Modulus (PSI) | 275000 | 364000 | 260000 | 258000 | 290000 | 307000 |
| Tensile Stress@Yield (PSI) | 7510 | 8580 | 7400 | 7520 | 8290 | 8240 |
| Tensile Stress@Break (PSI) | 5110 | 6660 | 6550 | 6470 | 5360 | 6410 |
| Tensile Elongation@Yield (%) | 4.83 | 4.78 | 5.38 | 5.14 | 5.30 | 5.04 |
| Tensile Elongation@Break (%) | 141.90 | 39.34 | 166.82 | 149.00 | 96.66 | 83.20 |
| Yellowness Index | 19.10 | 4.00 | 12.70 | 13.10 | 9.60 | 6.60 |
| Transmission | 85.30 | 87.40 | 82.10 | 87.80 | 88.70 | 86.20 |
| Haze | 6.500 | 5.200 | 10.800 | 3.400 | 3.600 | 6.000 |

*265° C., 2.16 kg load, 4 min. dwell time

TABLE 4

| | Units | Sample #12 | Sample #13 | Sample #14 | Sample #15 |
|---|---|---|---|---|---|
| PC high flow | | 14.320 | 29.320 | 64.550 | 0.0 |
| PCCD, 2k poise | | 50.000 | 35.000 | 0.000 | 64.550 |
| R2 oligomer | | 35.000 | 35.000 | 35.000 | 35.000 |
| Pentaerythritol tetrastearate | | 0.300 | 0.300 | 0.300 | 0.300 |
| Phosphoric Acid prediluted to 10% | | 0.225 | 0.225 | 0.000 | 0.45 |
| PEP-Q | | 0.150 | 0.150 | 0.150 | 0.150 |
| Total | — | 100.00 | 100.00 | 100.00 | 100.45 |

TABLE 4-continued

|  | Units | Sample #12 | Sample #13 | Sample #14 | Sample #15 |
|---|---|---|---|---|---|
| Properties |  |  |  |  |  |
| Flexural Modulus - Avg/0 | PSI | 281000 | 315000 | 381000 | 247000 |
| HDT-ASTM-MTV/1 | °C. | 72.2 | 84.6 | 110.1 | 63.0 |
| Izod Impact Strength - Room Temp. | lbf/in | 0.208 | 0.237 | 0.222 | 0.251 |
| Izod Ductility - Room Temp. | % | 0 | 0 | 0 | 0 |
| MAIMPACT Ductility - Room Temp. | % | 60 | 0 | 0 | 80 |
| MAIMPACT Total Energy - Room Temp | ft-lbf | 28.7 | 7.7 | 7.8 | 32.2 |
| MAIMPACT Total Energy - (0° C.) | ft-lbf | 25.9 | 5.1 | 5.5 | 3.1 |
| MAIMPACT - Ductility (0° C.) | % | 40 | 0 | 0 | 0 |
| Tensile Modulus | PSI | 266000 | 310000 | 391000 | 229000 |
| Tensile Elongation @ Break | % | 161.26 | 76.54 | 30.14 | 195.00 |
| Yellowness Index/0 | — | 3.80 | 3.30 | 2.80 | 3.90 |
| Transmission/0 | % | 88.80 | 88.40 | 89.00 | 88.00 |
| Haze/0 | % | 2.100 | 2.100 | 2.100 | 5.900 |
| Melt Volume Rate* | cm³/10 min | 82.59 | 77.66 | 57.26 | 92.98 |

*265° C., 2.16 kg load, 4 min. dwell time

TABLE 5

| Composition | Units | Sample #16 | Sample #17 |
|---|---|---|---|
| PC high flow |  | 12.66 | 11.00 |
| PCCD, 2k poise |  | 48.33 | 46.670 |
| R2 oligomer |  | 33.33 | 31.670 |
| Pentaerythritol tetrastearate |  | 0.300 | 0.300 |
| Phosphoric Acid pre-diluted to 10% |  | 0.225 | 0.225 |
| PEP-Q |  | 0.150 | 0.150 |
| Blendex - 415 |  | 5.00 | 10.00 |
| Total |  | 100.00 | 100.00 |
| Properties |  |  |  |
| Izod Impact Strength - Room Temp. | lbf/in | 0.193 | 2.834 |
| Izod Ductility - Room Temp. | % | 0 | 100 |
| Izod Impact strength - 0° C. | lbf/in | 0.266 | 0.166 |
| Izod Ductility - 0° C. | % | 0 | 0 |
| MAIMPACT Ductility - Room Temp. | % | 0 | 80 |
| MAIMPACT Total Energy - Room Temp. | lbf/in | 10.8 | 39.4 |
| MAIMPACT Ductility (−30° C.) |  | 0 | 60 |
| MAIMPACT Total Energy (−30° C.) | lbf/in | 5.7 | 26.9 |
| Yellowness Index | — | 7.5 | 8.20 |
| Transmission | % | 86.10 | 86.10 |
| Haze | % | 11.30 | 8.30 |
| Melt Volume Rate* | cm³/10 min | 53.48 | 36.17 |

*265° C., 2.16 kg load, 4 min. dwell time

TABLE 6

| Composition |  | PC 105 | PMMA |
|---|---|---|---|
| PC 105 |  | 100 |  |
| PMMA |  |  | 100 |
| Properties |  |  |  |
| Melt Volume Rate (250 C./5 kg) | ml/10 min | 3.8 | 36.2 |
| Vicat B120 | °C. | 146.5 | 100.2 |
| Heat Distortion Temperature | °C. | 127.7 | 76.9 |
| Tensile Modulus | MPa | 2312 | 3091 |
| Tensile Yield Strength | MPa | 61.9 | 63.4 |
| Tensile Elongation at Break | % | 126.3 | 2.5 |
| Notched Izod Impact Energy (Izod at Room Temp.) | lbf/inch | 73.3 | 2.8 |
| Notched Izod Impact Ductility (Izod at Room Temp.) | % | 100% | 0 |
| MAIMPACT Maximum Force (Room Temp.) | N | 10923 | 942 |
| MAIMPACT Energy at Max. Load (Room Temp.) | J | 131 | 1.3 |
| MAIMPACT Energy at Break (Room Temp.) | J | 137.7 | 2.6 |
| MAIMPACT Deflection at Break (Room Temp.) | mm | 23.1 | 5.3 |
| MAIMPACT Ductility (Room Temperature) | % | 100 | 0 |
| Color Standard | L | 93.36 | 92.81 |
| Initial Color (Engel 1) | A | −0.18 | −0.07 |
| Color Reflection | B | 3.21 | 4.05 |
| Transmission | % | 91.2 | 92.2 |
| Haze | % | 2.38 | 4.1 |
| Initial Gloss | 20 degree | 179.9 | 136.1 |
|  | 60 degree | 164.8 | 127.7 |

TABLE 7

| Composition | PC | PCCD | R2 | Sample #18 | Sample #19 | Sample #20 | Sample #20 | Sample #21 | Sample #22 |
|---|---|---|---|---|---|---|---|---|---|
| PC high flow | 100 | | | 14.47 | 44.47 | 39.47 | 26.97 | 29.47 | 49.47 |
| PCCD ($\eta$ = 2k) | | 100 | | 50.00 | 20.00 | 50.00 | 50.00 | 35.00 | 30.00 |
| R2 oligomer | | | 100 | 35.00 | 35.00 | 10.00 | 22.50 | 35.00 | 20.00 |
| Tg (° C.) | 143 | 70 | 119 | 93.5 | 117 | 98.6 | 95.8 | 106.1 | 113.8 |

Figure 3:
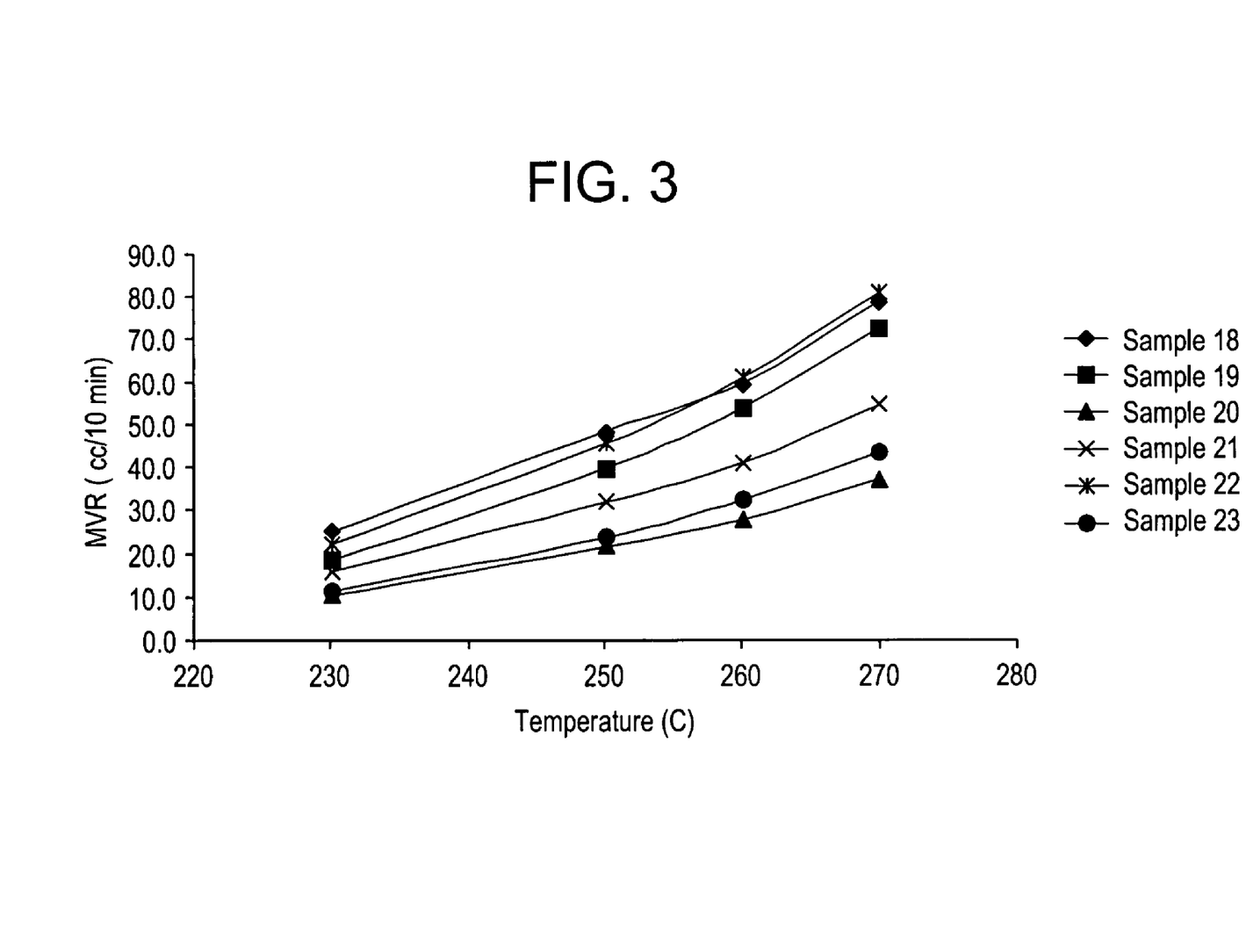
FIG. 3 is a graphical representation of the low temperature processability afforded by polycarbonate-poly(1,4-cyclohexane-dimethanol-1,4-cyclohexanedicarboxylate) blends.

The improved low temperature processability of the polycarbonate-poly(1,4-cyclohexanedimethanol-1,4-cyclohexanedicarboxylate) blends having the compositions shown in Table 7 is shown in FIG. 3.

From these experiments, it may be seen that the thermoplastic blends comprising polycarbonate and poly(1,4-cyclohexanedimethanol-1,4-cyclohexanedicarboxylate) have numerous advantages. These blends may be formed at low temperatures, which permit them to be used on substrates having low thermal resistance. They are also free of defects such as comets and veins, when examined in polarized light. They may therefore be advantageously used in optical applications such as optical elements, ophthalmic sheets, microscopes and the like. The methods of forming such high quality optical films and sheets advantageously permit them to be formed at birefringence retardations of either less than or equal to about 100 nm or at birefringence retardations of greater than or equal to about 750 nm. These methods permit the film to be formed without any defects upon manufacturing. In the event that a film with defects is detected, it can be corrected and used in an optical application.

Additionally the films may be utilized in layered optical application such as a protective cover for polarizers, and the like. The films and sheets because of their advantageous low temperature properties may be used in such layered applications without destroying or degrading any other components of the layered optical application that possess low thermal resistance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a film or sheet comprising:
   extruding a polymeric alloy, the polymeric alloy being a blend of thermoplastics resins; the blend being optically transparent; and
   deforming the polymeric alloy in a roll mill at a temperature effective to impart to the deformed polymeric alloy a birefringence retardation of greater than or equal to about 750 nanometers; the deforming being conducted after the extruding.

2. The method of claim 1, wherein the polymeric alloy is thermoplastic, and wherein the polymeric alloy comprises at least three polymeric resins.

3. The method of claim 1, wherein the polymeric alloy comprises oligomers, polymers, branched polymers, dendrimers, ionomers, copolymers, star block copolymers, graft copolymers, block copolymers, random copolymers, or a combination comprising at least one of the foregoing polymers.

4. The method of claim 1, wherein the polymeric alloy is thermoplastic and wherein the thermoplastic is a polyethylene, polypropylene, polyamide, polyester, polyimide, polyacetal, polyacrylic, polycarbonate, polystyrene, polyamideimide, polyarylate, polyacrylate, polymethacrylate, polyurethane, polyarylsulfone, polyethersulfone, polyarylene sulfide, polyvinyl chloride, polysulfone, polyetherimide, polytetrafluoroethylene, polyetherketone, polyether etherketone, polyarylene ether, liquid crystalline polymer, or a combination comprising at least one of the foregoing thermoplastics.

5. The method of claim 4, wherein the polyester is polyethelene terephthalate, polybutylene terephthalate, poly(1,4-cyclohexane-dimethanol-1,4-cyclohexanedicarboxylate), poly(trimethylene terephthalate), poly(cyclohexanedimethanol-co-ethylene terephthalate), or a blend comprising blend comprising 100 mole percent terephthalic acid, 65 mole percent 1,4-cyclohexanedimethanol and 35 mole percent ethylene glycol.

6. The method of claim 5, wherein the polymeric alloy comprises a polycarbonate-polyester blend.

7. The method of claim 6, wherein the polycarbonate-polyester blend comprises polycarbonate-poly(1,4-cyclohexane-dimethanol-1,4-cyclohexanedicarboxylate).

8. The method of claim 1, wherein the polymeric alloy comprises polycarbonate-poly(cyclohexanedimethanol-co-ethylene terephthalate), polycarbonate-polyethylene terephthalate, polycarbonate-polybutylene terephthalate, polycarbonate with a blend comprising 100 mole percent terephthalic acid, 65 mole percent 1,4-cyclohexanedimethanol and 35 mole percent ethylene glycol, PC-PPC, polycarbonate-polymethylmethacrylate, polycarbonate-blend comprising 100 mole percent (mole %) terephthalic acid, 65 mole percent 1,4-cyclohexanedimethanol and 35 mole percent ethylene glycol, polycarbonate-poly(1,4-cyclohexanedimethanol-1,4-cyclohexanedicarboxylate)-poly(cyclohexanedimethanol-co-ethylene terephthalate), polycarbonate-copolyester-polycarbonate with a blend comprising 100 mole percent terephthalic acid, 65 mole percent 1,4-cyclohexanedimethanol and 35 mole percent ethylene glycol, or a combination comprising at least one of the foregoing.

9. The method of claim 1, wherein the temperature at which the deforming occurs is lower than the glass transition temperature of the polymeric alloy.

10. The method of claim 1, wherein the deforming occurs by shear, compression or elongational forces or a combination of any two of the foregoing forces or all three of the foregoing forces.

11. The method of claim 1, wherein the deforming occurs in a two roll mill or in a three roll mill.

12. The method of claim 1, wherein the polymeric alloy may be deformed into a film or a sheet.

13. The method of claim 1, wherein the film or sheet is substantially free of comets or veins or both.

14. The method of claim 12, further comprising employing the film or sheet in an optical device, wherein the optical device provides light polarization, photo-chromism, tint, color, decor, indicia, hardness, anti-abrasion, anti fog, X-ray recording, photographic filming, digital storage, light management capabilities or a combination of at least one of the foregoing capabilities.

15. The method of claim 1, wherein the polymeric alloy has a melt viscosity rate of greater than or equal to about 5 cubic centimeters/10 minutes when measured at 265° C. with a load of 2.16 kilograms and a dwell time of four minutes.

16. The method of claim 15, wherein the polymeric alloy has a glass transition temperature of less than or equal to about 205° C.

17. The method of claim 1, wherein the polymeric alloy is free from UV stabilizer.

18. The method of claim 1, further comprising affixing the polymeric alloy to a substrate after the deformation.

19. The method of claim 18, wherein the polymeric alloy is in the form of a film of thickness of less than or equal to about 1000 micrometers and wherein the substrate is a polarizer in an optical device.

20. The method of claim 18, wherein the affixing comprises molding the polymeric alloy to the substrate.

21. A method comprising:
annealing a film or sheet comprising a polymeric alloy to a temperature greater than a lowest glass transition temperature of a polymeric resin contained in the polymeric alloy; wherein the polymeric alloy being a blend of polycarbonate and a second polymeric resin; the blend being optically transparent.

22. The method of claim 21, wherein the temperature of annealing is greater than or equal to about a highest glass transition temperature of the polymeric resins contained in the polymeric alloy.

23. The method of claim 21, wherein the temperature of annealing is greater than a glass transition temperature of the polymeric alloy.

24. The method of claim 21, wherein the polymeric alloy comprises a polycarbonate-polyester blend.

25. The method of claim 24, wherein the polycarbonate-polyester blend comprises polycarbonate-poly(1,4-cyclohexane-dimethanol-1,4-cyclohexanedicarboxylate).

26. The method of claim 21, wherein the polymeric alloy comprises polycarbonate-poly(cyclohexanedimethanol-co-ethylene terephthalate), polycarbonate-polyethylene terephthalate, polycarbonate-polybutylene terephthalate, polycarbonate with a blend comprising 100 mole percent terephthalic acid, 65 mole percent 1,4-cyclohexanedimethanol and 35 mole percent ethylene glycol, PC-PPC, polycarbonate-polymethylmethacrylate, polycarbonate-blend comprising 100 mole percent (mole %) terephthalic acid, 65 mole percent 1,4-cyclohexanedimethanol and 35 mole percent ethylene glycol, polycarbonate-poly(l,4-cyclohexane-dimethanol-1,4-cyclohexanedicarboxylate)-poly(cyclohexanedimethanol-co-ethylene terephthalate), polycarbonate-copolyester-polycarbonate with a blend comprising 100 mole percent terephthalic acid, 65 mole percent 1,4-cyclohexanedimethanol and 35 mole percent ethylene glycol, or a combination comprising at least one of the foregoing.

27. A method comprising:
annealing a film or sheet comprising a polymeric alloy to a temperature greater than a lowest glass transition temperature of a polymeric resin contained in the polymeric alloy; wherein the polymeric alloy being a blend of polycarbonate and a second polymeric resin; the blend being optically transparent; and wherein the polymeric alloy has a melt viscosity rate of greater than or equal to about 5 cubic centimeters/10 minutes when measured at 265° C. with a load of 2.16 kilograms and a dwell time of four minutes.

28. The method of claim 27, wherein the temperature of annealing is greater than or equal to about a highest glass transition temperature of the polymeric resins contained in the polymeric alloy.

29. The method of claim 27, wherein the temperature of annealing is greater than a glass transition temperature of the polymeric alloy.

30. The method of claim 27, wherein the polymeric alloy comprises a polycarbonate-polyester blend.

31. An optical device manufactured by the method of claim 1.

32. An optical device manufactured by the method of claim 21.

33. An optical device manufactured by the method of claim 27.

34. A method for manufacturing a film or sheet comprising:
deforming a polymeric alloy, the polymeric alloy being a blend of thermoplastics resins; the blend being optically transparent; in a roll mill at a temperature effective to impart to the deformed polymeric alloy a birefringence retardation of greater than or equal to about 750 nanometers; wherein a machine part contacting the polymeric alloy and applying the deforming forces is maintained at a temperature below the glass transition temperature of the polymeric alloy.

35. The method of claim 34, wherein the machine part contacting the polymeric alloy and applying the deforming forces is maintained at a temperature of 5° C. to 20° C. below the glass transition temperature of the polymeric alloy during the deformation.

36. The method of claim 34, wherein the polymeric alloy comprises a polycarbonate-polyester blend.

37. The method of claim 36, wherein the polycarbonate-polyester blend comprises polycarbonate-poly(1,4-cyclohexane-dimethanol-1,4-cyclohexanedicarboxylate).

38. The method of claim 34, wherein the polymeric alloy comprises polycarbonate-poly(cyclohexanedimethanol-co-ethylene terephthalate), polycarbonate-polyethylene terephthalate, polycarbonate-polybutylene terephthalate, polycarbonate with a blend comprising 100 mole percent terephthalic acid, 65 mole percent 1,4-cyclohexanedimethanol and 35 mole percent ethylene glycol, PC-PPC, polycarbonate-polymethylmethacrylate, polycarbonate-blend comprising 100 mole percent (mole %) terephthalic acid, 65 mole percent 1,4-cyclohexanedimethanol and 35 mole percent ethylene glycol, polycarbonate-poly(1,4-cyclohexane-dimethanol-1,4-cyclohexanedicarboxylate)-poly(cyclohexanedimethanol-co-ethylene terephthalate), polycarbonate-copolyester-polycarbonate with a blend comprising 100 mole percent terephthalic acid, 65 mole percent 1,4-cyclohexanedimethanol and 35 mole percent ethylene glycol, or a combination comprising at least one of the foregoing.

39. The method of claim 34, wherein the temperature at which the deforming occurs is lower than the glass transition temperature of the polymeric alloy.

40. The method of claim 34, wherein the deforming occurs in a two roll mill or in a three roll mill.

41. The method of claim 34, wherein the polymeric alloy may be deformed into a film or a sheet.

42. The method of claim 34, wherein the film or sheet is substantially free of comets or veins or both.

43. A method for manufacturing a film or sheet comprising:
 deforming a polymeric alloy, the polymeric alloy being a blend of thermoplastics resins; the blend being optically transparent, in a roll mill to form a sheet or a film; and
 annealing the sheet or film at a temperature effective to produce a birefringence retardation of less than or equal to about 100 nm; the annealing being conducted after the deforming.

44. The method of claim 43, wherein the film or sheet is substantially free of comets or veins or both.

45. The method of claim 43, wherein the polymeric alloy comprises a polycarbonate-polyester blend.

46. The method of claim 45, wherein the polycarbonate-polyester blend comprises polycarbonate-poly(1,4-cyclo-hexane-dimethanol-1,4-cyclohexanedicarboxylate).

47. The method of claim 43, wherein the polymeric alloy comprises polycarbonate-poly(cyclohexanedimethanol-co-ethylene terephthalate), polycarbonate-polyethylene terephthalate, polycarbonate-polybutylene terephthalate, polycarbonate with a blend comprising 100 mole percent terephthalic acid, 65 mole percent 1,4-cyclohexanedimethanol and 35 mole percent ethylene glycol, PC-PPC, polycarbonate-polymethylmethacrylate, polycarbonate-blend comprising 100 mole percent (mole %) terephthalic acid, 65 mole percent 1,4-cyclohexanedimethanol and 35 mole percent ethylene glycol, polycarbonate-poly(1,4-cyclohexane-dimethanol-1,4-cyclohexanedicarboxylate)-poly(cyclohex-anedimethanol-co-ethylene terephthalate), polycarbonate-copolyester-polycarbonate with a blend comprising 100 mole percent terephthalic acid, 65 mole percent 1,4-cyclo-hexanedimethanol and 35 mole percent ethylene glycol, or a combination comprising at least one of the foregoing.

48. The method of claim 43, wherein the temperature at which the deforming occurs is lower than the glass transition temperature of the polymeric alloy.

49. The method of claim 43, wherein the deforming occurs in a two roll mill or in a three roll mill.

\* \* \* \* \*